(No Model.)
W. OESTERLEIN.
Friction Clutch.
No. 235,558. Patented Dec. 14, 1880.
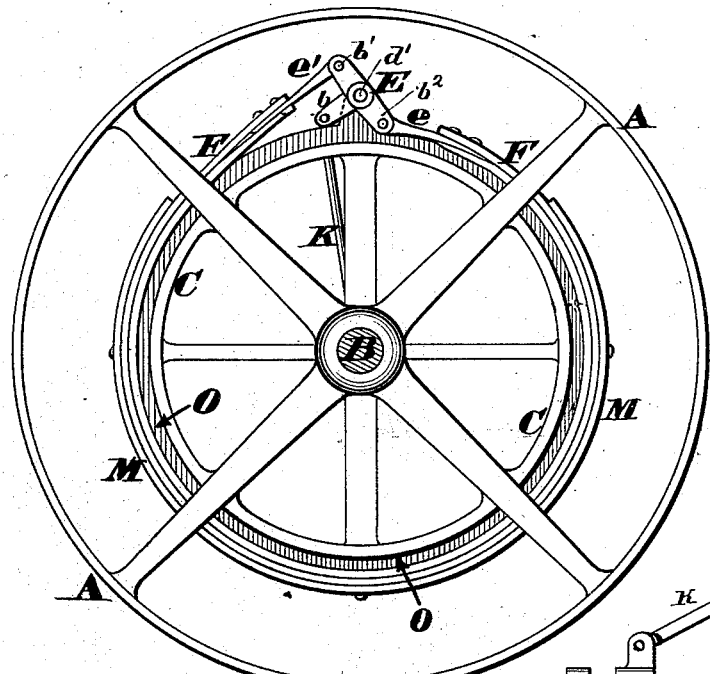
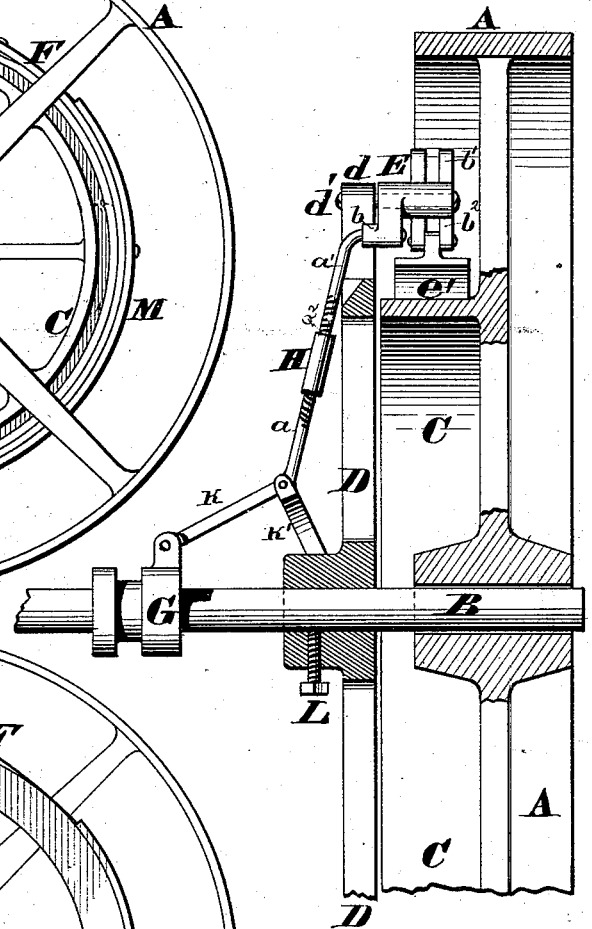
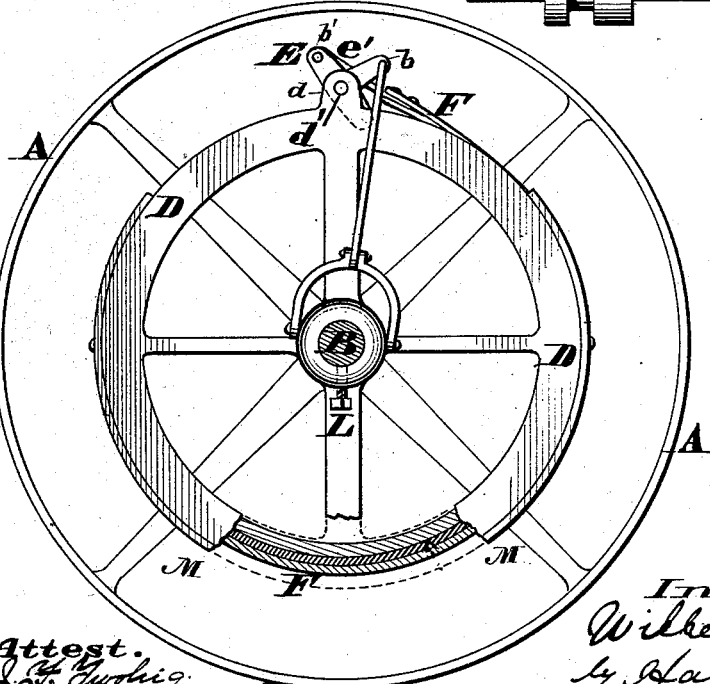
Attest:
J. H. Guohig.
James D Cranley
Inventor:
Wilhelm Oesterlein
by Hatch & Shin,
his attys.

UNITED STATES PATENT OFFICE.

WILHELM OESTERLEIN, OF CINCINNATI, OHIO.

FRICTION-CLUTCH.

SPECIFICATION forming part of Letters Patent No. 235,558, dated December 14, 1880.

Application filed June 28, 1880. (No model.)

*To all whom it may concern:*

Be it known that I, WILHELM OESTERLEIN, of Cincinnati, in the county of Hamilton and State of Ohio, have invented certain new and useful Improvements in Friction-Clutches, of which the following is a full, clear, and exact description, reference being had to the accompanying drawings, making part of this specification, in which—

Figure 1 is a side elevation of a pulley and the friction-clutch. Fig. 2 is a side elevation of the opposite side. Fig. 3 is a perpendicular section of the upper part of Figs. 1 and 2.

The object of my invention is to provide an effective friction-clutch for transmitting power from a revolving pulley or wheel to a shaft without noise or strain to the machinery, and I will now describe my invention in detail, and point out the novel construction and combination of parts in the claims.

A indicates a loose pulley or idler. This pulley revolves on the shaft B, (a cogged wheel or any other suitable gearing may be used,) to which the revolving motion is to be imparted. The pulley A is constructed with a central interior annular hub, C.

A disk or wheel, D, is arranged on the shaft B, and rigidly attached to it by the set-screw L, or other suitable means. On one side of this wheel is a lug, $d$, through which extends inwardly a stationary pin, $d'$, over, but not touching, the interior annular hub, C. To the pin $d'$ is attached the lever E, which actuates the friction-band, and the particular construction and arrangement of this lever form the essential features of my invention. The lever is composed of three arms, $b\ b'\ b^2$, arranged substantially at right angles to each other, respectively. To the arm $b$ is attached the rod $a'$ of a turn-buckle, and to the arms $b'\ b^2$ are respectively attached the ends $e\ e'$ of the friction-band. Therefore, when the arm $b$ is moved upwardly or away from the annular hub C of the idler A, the arms $b'\ b^2$ draw respectively on the ends $e\ e'$ of the friction-belt, and the latter is caused to grasp the annular hub C with a uniform frictional contact.

The friction-belt F consists of two bands, the outer one of steel, which prevents stretching; the inner one of leather, which gives to the belt the required adhesion.

On the shaft B is a sliding collar, G, which moves freely on the shaft, and can be moved on the shaft by means of a forked lever or any other suitable device. The collar G is connected with the belt-operating lever E by a toggle-joint, consisting of the lever K, pivoted to the sliding collar and to a lever-yoke, K', which embraces and is pivoted to the hub of the fixed disk or wheel D. When the sliding collar G is moved away from the disk or wheel D the toggle-joint is loosened, and the operating-lever E is turned so that the friction band or belt F is relaxed, and the pulley A revolves loosely on the shaft B, the shaft remaining stationary. By moving the collar G up toward the wheel D the toggle-joint K is straightened and turns the lever E, tightening the friction-belt F around the central annular hub, C, of the pulley A, firmly attaching the pulley to the disk D, so that as the pulley revolves it carries with it the disk D, which, being fastened to the shaft by the set-screw L, revolves this shaft B, thus imparting the desired motion.

The toggle-joint is connected with the bell-crank lever by means of two rods, $a\ a'$, which are attached at their ends to the toggle-joint and operating-lever E, respectively, the said rods being screw-threaded, as at $a^2$, and joined together by an internally-screw-threaded thimble, H, the whole forming a turn-buckle, the object of which is to adjust the parts to make the friction-belt tighter or looser, as may be found necessary.

The disk D is provided with a shield, consisting in its best form of a sheet-metal band pivoted to its periphery, and extending laterally over the friction-belt, but not coming in contact with it, forming around the central hub, C, a race, O, in which the belt F moves. When the belt is not in use and is loose this shield holds it in place and prevents its lagging too far from the wheel or getting out of place. Fig. 2 shows this shield, a section being cut away at M M, revealing the friction-belt F.

Having fully described my invention, what I claim, and desire to secure by Letters Patent, is—

1. The combination of the loose pulley or idler A, having the annular hub C, and the fixed disk or wheel D, having the laterallyprojecting pin $d'$, with the lever E, pivoted to said pin, and consisting of the arms $b$, $b'$, and $b^2$, the friction-belt having its ends attached, respectively, to the arms $b'$ $b^2$, the turn-buckle connected to the arm $b$ and the toggle-joint K K′, and the sliding collar G, the said members being arranged in the described relation, substantially as described.

2. In combination with the friction-belt, the turn-buckle, the toggle-joint K K′, and sliding collar G, the toggle being pivoted, respectively, to the collar and to the hub of the disk or wheel D, substantially as described.

WILHELM OESTERLEIN.

Witnesses:
JOSEPH FEY,
GEORGE STIFEL.